US006949889B2

(12) United States Patent
Bertrand

(10) Patent No.: US 6,949,889 B2
(45) Date of Patent: Sep. 27, 2005

(54) WIDE INPUT VOLTAGE RANGE LIGHT EMITTING DIODE DRIVER

(75) Inventor: Jeffrey John Bertrand, Hazel Green, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 10/763,783

(22) Filed: Jan. 23, 2004

(65) Prior Publication Data

US 2005/0162096 A1  Jul. 28, 2005

(51) Int. Cl.[7] ............................................. H05B 37/00
(52) U.S. Cl. .................. 315/291; 315/200 R; 315/205; 315/207
(58) Field of Search ............................. 315/200 R, 205, 315/207, 291

(56) References Cited

U.S. PATENT DOCUMENTS 6,320,330 B1 * 11/2001 Haavisto et al. ............. 315/291
6,400,102 B1 * 6/2002 Ghanem ...................... 315/291

* cited by examiner

Primary Examiner—David Vu
(74) Attorney, Agent, or Firm—Allen, Dyer, Doppelt, Milbrath & Gilchrist, P.A.

(57) ABSTRACT

A current-regulating driver circuit for a light emitting diode (LED) maintains energization drive to and thereby illumination provided by the LED at a prescribed, substantially constant value, over a relatively wide range of input (AC or DC) voltage. First and second input nodes are coupled to a source of AC or DC voltage and to a load, powered by the source of AC or DC voltage. An input rectifying diode is coupled to the first input node. A controlled current flow element is coupled in a first current flow path between the input rectifying diode and the LED and is controllably operative to supply current for illuminating the LED. A controlled current regulation circuit that includes a sense resistor coupled in series with the LED is coupled with the controlled current flow element between the first and second nodes, and is operative to regulate current supplied over the first current flow path by the controlled current flow element to the LED, and thereby accommodate variations in the value of the source of AC or DC voltage.

7 Claims, 1 Drawing Sheet

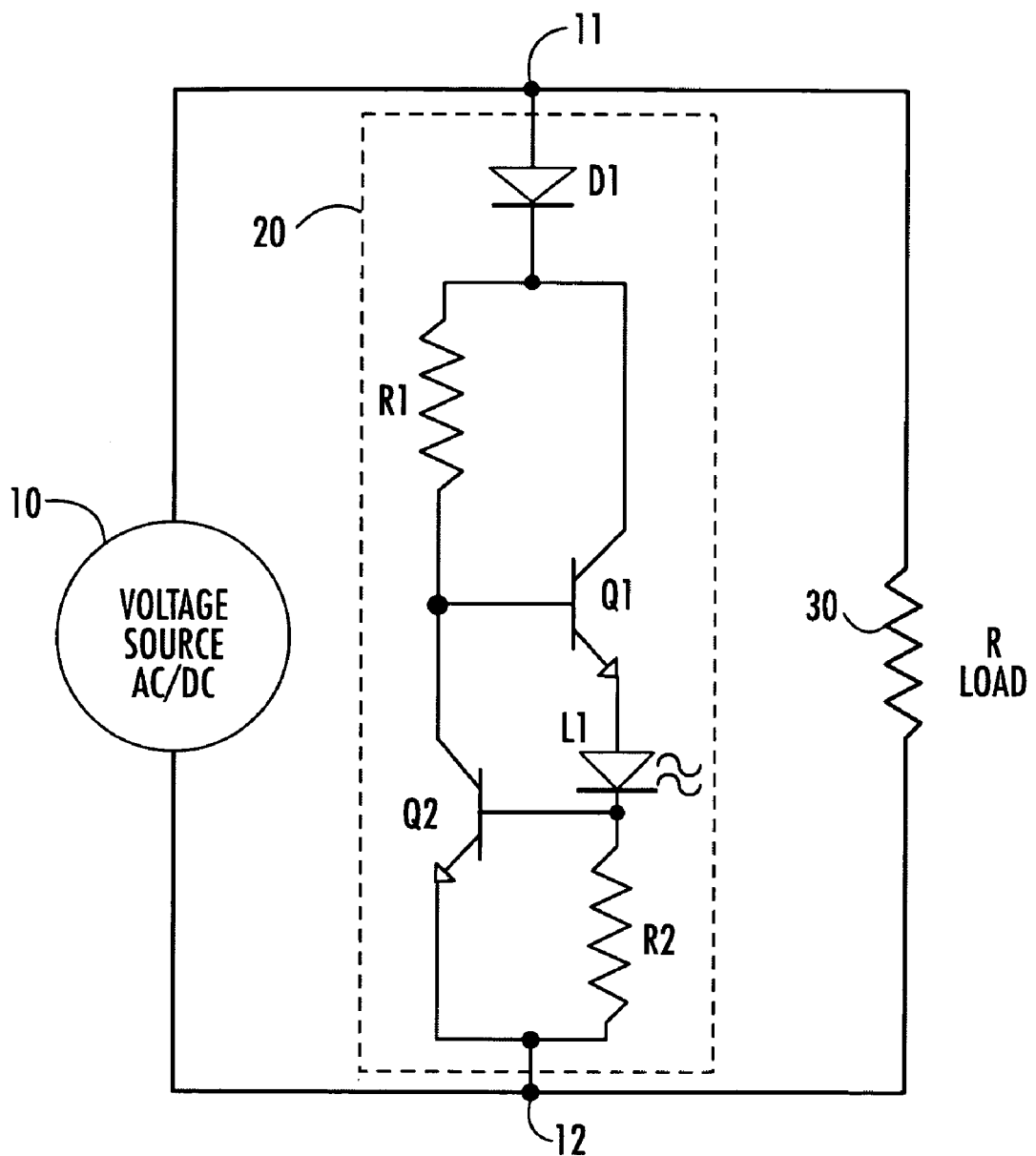

WIDE INPUT VOLTAGE RANGE LIGHT EMITTING DIODE DRIVER

FIELD OF THE INVENTION

The present invention relates in general to communication circuits and the like, and is particularly directed to a new and improved indicator circuit, specifically, a current-regulating driver circuit for a light emitting diode (LED), which is operative to maintain the energization drive to and thereby the illumination provided by the LED at a prescribed, substantially constant value, over a relatively wide range of input (AC or DC) voltage.

BACKGROUND OF THE INVENTION

Electronic circuits often employ light emitting diodes (LEDs) to indicate the presence of an operational voltage or electrical power. In a typical application, the LED will be coupled in parallel with the load that is consuming electrical power. In order to operate within specified parameters, LEDs require a relatively narrow range of direct current and voltage. As a result, to use an LED as an indicator, it is customary practice to employ a series, current-limiting resistor that sets the operational parameters for the LED for a given application. A shortcoming of this approach is that a different valued resistor must be selected for each application. This limits the utility of a given driver circuit; moreover, the voltage must be a DC voltage of the proper polarity. It does not allow the same LED driver circuit to be used in the presence of a widely varying input voltage, nor does it allow for either AC or DC voltage.

SUMMARY OF THE INVENTION

In accordance with the present invention, shortcomings of conventional LED driver circuits, including those referenced above, are effectively obviated by a current-regulating driver circuit for a light emitting diode (LED), which is operative to maintain the energization drive to and thereby the illumination provided by the LED at a prescribed, substantially constant value, over a relatively wide range of input (AC or DC) voltage. To this end, the circuit architecture of the light-emitting diode (LED) circuit of the present invention comprises a pair of input/output nodes through which a voltage source, which may comprise either an AC or a DC voltage source, is coupled to a load. A first of the input/output nodes is coupled through an input rectifying diode to each of a first, series limiting resistor and to the collector of an LED current supply transistor. The input diode serves to allow current to pass through the circuit in only one direction and allows the invention to be employed with an AC voltage source, a DC voltage source of the correct polarity, or both.

The limiting resistor has a value that sets the input bias current of the LED current supply transistor. The LED current supply transistor has its base coupled to a second end of the limiting resistor, which is also coupled to the collector of a current sense transistor. This current sense transistor is adapted to pass a collector current that is larger than the base bias current for the LED current supply transistor, so as to regulate the current flow through the LED. The LED current supply transistor has its emitter coupled to a light emitting diode which is coupled to the base of the current sense transistor and to a second, current sense resistor. The second resistor and the emitter of the current sense emitter of transistor are coupled to the second input/output node. The current sense resistor is used to set the current through the LED and, at the same time, just turns on the base-emitter junction of the current sense transistor.

In operation, application of either an AC voltage or a DC voltage of the appropriate polarity to the input/output nodes will cause current to flow through the input diode and through the limiting resistor, so as to forward bias the base-emitter junction of the LED supply transistor. This turns on that transistor, causing current to flow from the input diode through the collector-emitter path of the LED current supply transistor and forward bias the LED, so that the LED turns on.

The current flowing through the collector-emitter path of the LED supply transistor and through the LED also flows through sense resistor to the second input/output node. The resulting voltage drop across the sense resistor is applied to the base-emitter junction of the sense transistor. As current through the path containing the LED supply transistor, the LED and the sense resistor increases, it will eventually reach a point that the voltage drop across the sense resistor will exceed the turn-on voltage of the base-emitter junction of the sense transistor. As the sense transistor turns on, it begins to draw current away from the base of the LED supply transistor, thereby reducing the base bias to the LED supply transistor, and decreasing the current flow through the collector-emitter path of the LED supply transistor. Reducing the current flow through the collector-emitter path of the LED supply transistor also reduces current flow through the LED and the sense resistor. Namely, with respect to the base bias current of the LED supply transistor, the sense resistor and the sense transistor serve to effectively provide current regulation for the LED irrespective so as to accommodate a wide swing the value of the input voltage.

BRIEF DESCRIPTION OF THE DRAWINGS

The single FIGURE diagrammatically illustrates the overall architecture of the current regulating, light-emitting diode (LED) driver circuit in accordance with the present invention.

DETAILED DESCRIPTION

The overall architecture of the light-emitting diode (LED) circuit in accordance with the present invention is shown diagrammatically in the single FIGURE of drawings, as comprising respective first and second nodes 11 and 12 through which a voltage source 10, which may comprise either an AC or a DC voltage source, is coupled to a load, shown as a resistive load 30 for purposes of simplification. The LED circuit of the invention is contained in broken lines 20 and comprises an input rectifying diode D1 having its anode coupled to node 11 and its cathode coupled to each of a first end of first, series limiting resistor R1 and to the collector of a first bipolar (NPN), LED current supply transistor Q1. Input diode D1 has a peak inverse breakdown voltage that is higher than the peak operating voltage supplied by source 10 to nodes 11 and 12. Input diode D1 serves to allow current to pass through the circuit in only one direction and allows the invention to be employed with an AC voltage source, a DC voltage source of the correct polarity, or both. Resistor R1 has a value that is selected to set the input bias current of transistor Q1. Current supply transistor is chosen to have a collector-emitter breakdown voltage that is higher than the applied peak operating voltage.

It is to be understood that although the transistors of circuit 20 are shown as bipolar devices, other functionally equivalent devices, such as field effect transistors, as a non-limiting example, may be alternatively be employed. LED current supply transistor Q1 has its base coupled to a second end of resistor R1, which is coupled to the collector of a second bipolar current sense (NPN) transistor Q2. Current sense transistor is operative to pass a collector current that is larger than the base bias current for transistor Q1. Transistor Q1 has its emitter coupled to the anode of a light emitting diode L1, the cathode of which is coupled to the base of transistor Q2 and to one end of a second, current sense resistor R2. Although only a single LED L1 is illustrated (in order to reduce the complexity of the drawings), it is to be understood that the invention is also applicable to the case where multiple LEDs are connected in series. The second end of resistor R2 and the emitter of transistor Q2 are coupled to node 12. As will be described, the current sense resistor R2 is used to set the current through the LED L1 and, at the same time, just turns on the base-emitter junction of current sense transistor Q2.

The LED circuit of the present invention operates as follows. The application of either an AC voltage source or a DC voltage source of the appropriate voltage polarity to nodes 11 and 12 will cause current to flow through the input diode D1 and through limiting resistor R1, so as to forward bias the base-emitter junction of transistor Q1. This turns on transistor Q1, causing current from diode D1 to flow through the collector-emitter path of transistor Q1 and forward bias LED L1, so that LED L1 turns on.

The current flowing through the collector-emitter path of transistor Q1 and through LED L1 also flows through sense resistor R2 to node 12. The resulting voltage drop across sense resistor R2 is applied to the base-emitter junction of sense transistor Q2. As current flow through the path containing transistor Q1, LED L1 and sense resistor R2 increases, it will eventually reach a point that the voltage drop across sense resistor R2 will exceed the turn-on voltage of the base-emitter junction of transistor Q2. As it turns on, transistor Q2 begins to draw current away from the base of transistor Q1, thereby reducing the base bias to transistor Q1, and consequently decreasing the current flow through the collector-emitter path of transistor Q1. Reducing the current flow through the collector-emitter path of transistor Q1 also means that current flow through LED L1 and resistor R2 is reduced. Namely, the action of sense resistor R2 and sense transistor Q2 with respect to the base bias current of transistor Q1 serves to effectively regulate the current through the LED L1 over a relatively wide range of input voltage. While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A driver circuit for at least one light emitting diode device comprising:
   first and second input nodes, which are adapted to be coupled to a source of AC or DC voltage and to which a load, powered by said source of AC or DC voltage is coupled;
   an input rectifying diode coupled to said first input node;
   a controlled current flow element coupled in a first current flow path between said input rectifying diode and said at least one light emitting diode device, and being controllably operative to supply current for illuminating said at least one light emitting diode device; and
   a controlled current regulation circuit coupled with said controlled current flow element between said first and second nodes and being operative to regulate the amount of current supplied over said first current flow path by said controlled current flow element to said at least one light emitting diode device, and thereby accommodate variations in the value of said source of AC or DC voltage.

2. The driver circuit according to claim 1, wherein said controlled current flow element comprises a first transistor having an input electrode coupled to said input rectifying diode, an output electrode coupled to said at least one light emitting diode device, and a control electrode coupled through a limiting resistor to said input rectifying diode.

3. The driver circuit according to claim 2, wherein said controlled current regulation circuit comprises a sense resistor coupled between said at least one light emitting diode device and said second input/output node, and a second transistor having an input electrode coupled to the control electrode of said first transistor, an output electrode coupled to said second input/output node, and a control electrode coupled to said sense resistor.

4. A method of controlling application of electrical energy to at least one light emitting diode device to indicate the presence of electrical energy coupled to an associated load from a voltage source, said method comprising the steps of:
   (a) coupling a first path, through which said voltage source is coupled to said load, to an input rectifying diode;
   (b) coupling a current supply path for said at least one light emitting diode device to said input rectifying diode, and through a sense resistor to a second path through which said voltage source is coupled to said load;
   (c) providing a current regulation path between said input rectifying diode and said second path through which said voltage source is coupled to said load, and coupling said current regulation path to said current supply path for said at least one light emitting diode device; and
   (d) causing said current regulation path to regulate current flowing through said current supply path to said at least one light emitting diode device in accordance with the voltage sensed across said sense resistor.

5. The method according to claim 4, wherein said current supply path comprises a first transistor having an input electrode coupled to said input rectifying diode, an output electrode coupled to said at least one light emitting diode device, and a control electrode coupled through a limiting resistor to said input rectifying diode, and to said current regulation path.

6. The method according to claim 5, wherein said current regulation path comprises second transistor having an input electrode coupled to the control electrode of said first transistor, an output electrode coupled to said second input/output node, and a control electrode coupled to said sense resistor.

7. A driver circuit for at least one light emitting diode (LED) device comprising:
   first and second nodes through which a voltage source is coupled to a load;
   an input rectifying diode coupled between said first node and each of a first resistor and the collector of an LED current supply transistor, said LED current supply transistor having its base coupled said first resistor, which is coupled to the collector of a current sense transistor;

said current sense transistor being capable of passing a collector current that is larger than the base bias current for said LED current supply transistor;

said LED current supply transistor having its emitter coupled to said at least one LED, which is coupled to the base of said current sense transistor and to a current sense resistor;

said current sense resistor and the emitter of said current sense transistor being coupled to said second node; and wherein, application of either an AC voltage source or a DC voltage source of the appropriate voltage polarity to said first and second nodes will cause current to flow through said input diode and said first resistor, so as to forward bias the base-emitter junction of said LED current supply transistor, turning on said LED current supply transistor, causing current from said input diode to flow through the collector-emitter path of said LED current supply transistor and forward bias said LED to turn on; and wherein, as a result of current flowing through the collector-emitter path of said LED current supply transistor, said LED and said current sense resistor to said second node, a voltage drop across said sense resistor is applied to the base-emitter junction of said sense transistor, so that as current increases through a path containing said LED current supply transistor, said LED and said sense resistor, it eventually reach a point that the voltage drop across said sense resistor will exceed the turn-on voltage of the base-emitter junction of said sense transistor, causing said sense transistor to draw current away from the base of said LED current supply transistor, thereby reducing the base bias to said LED current supply transistor and consequently decreasing the current flow through the collector-emitter path of said LED current supply transistor; and wherein the resulting reduction in current flow through the collector-emitter path of said LED current supply transistor reduces current flow through said LED and said sense resistor so as to effectively regulate current through said LED over a relatively wide range of input voltage.

* * * * *